(12) United States Patent
Weicker et al.

(10) Patent No.: US 9,126,469 B2
(45) Date of Patent: Sep. 8, 2015

(54) VEHICLE WINDOW ASSEMBLY AND METHOD FOR MOUNTING A VEHICLE WINDOW ASSEMBLY

(71) Applicant: VOLVO CAR CORPORATION, Gothenburg (SE)

(72) Inventors: Robert Weicker, Gothenburg (SE); Marcus Albo, Hisings Karra (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/503,752

(22) Filed: Oct. 1, 2014

(65) Prior Publication Data
US 2015/0102625 A1    Apr. 16, 2015

(30) Foreign Application Priority Data
Oct. 10, 2013    (EP) ...................................... 13188037

(51) Int. Cl.
| | |
|---|---|
| B60J 1/02 | (2006.01) |
| B60J 1/00 | (2006.01) |
| H01Q 1/12 | (2006.01) |
| H01Q 1/32 | (2006.01) |

(52) U.S. Cl.
CPC .. B60J 1/008 (2013.01); B60J 1/02 (2013.01); H01Q 1/1271 (2013.01); H01Q 1/3275 (2013.01)

(58) Field of Classification Search
CPC ................ B60J 1/008; B60J 1/02; B60J 1/06; H01Q 1/1271; H01Q 1/3275
USPC .......... 296/84.1, 90, 96.11, 96.12, 96.19, 215
See application file for complete search history.

(56) References Cited

U.S. PATENT DOCUMENTS

| | | | |
|---|---|---|---|
| 6,118,410 A | 9/2000 | Nagy | |
| 2007/0052522 A1* | 3/2007 | Kokuryo et al. | ............. 340/10.1 |
| 2012/0256798 A1* | 10/2012 | Paulus et al. | .................. 343/713 |

FOREIGN PATENT DOCUMENTS

| | | |
|---|---|---|
| DE | 102008026732 A1 | 12/2009 |
| DE | 102011106829 A1 | 3/2012 |
| EP | 1376756 A2 | 1/2004 |
| EP | 1921708 A1 * | 5/2008 |

OTHER PUBLICATIONS

Extended European Search Report Dated Mar. 13, 2014, Application No. 13188037.9-1812—Applicant Volvo Car Corporation, 5 Pages.

* cited by examiner

*Primary Examiner* — Jason S Morrow
(74) *Attorney, Agent, or Firm* — Brooks Kushman P.C.

(57) ABSTRACT

The present disclosure relates to a vehicle window assembly adapted to be mounted vertically above a header beam, having a flange portion that extends in a direction towards the center of a vehicle until it transits into a depressed portion. The assembly comprises a communication module adapted to receive and/or send information signals, a main window area, and an extended window area. The extended window area is formed as a partial extension of the main window area in a direction away from an upper main window area border.

18 Claims, 3 Drawing Sheets

VEHICLE WINDOW ASSEMBLY AND METHOD FOR MOUNTING A VEHICLE WINDOW ASSEMBLY

CROSS-REFERENCE TO RELATED APPLICATIONS

This application claims foreign priority benefits under 35 U.S.C. §119(a)-(d) to European patent application number EP 13188037.9, filed Oct. 10, 2013, which is incorporated by reference in its entirety.

TECHNICAL FIELD

The present disclosure relates to the field of vehicle body parts and communication modules for vehicles, and more specifically to a vehicle window assembly, a vehicle provided with the assembly and a method for mounting the window assembly to a vehicle.

BACKGROUND

Today's vehicles, and in particular passenger cars are often provided with roof-mounted external radio antennas which have a characteristic "shark fin" design. However, there are some problems associated with this design. For instance, in order to achieve an optimal color-match with the overall appearance of the vehicle, the antenna should preferably be provided in the same color as the car body, which may cause color-match problems if the antenna needs to be replaced. Additionally, color-match problems may arise due to the difference in material characteristics between the car body and the shark fin antenna (i.e., metal versus plastic).

The shark fin design may also cause performance and durability issues, such as an increased aerodynamic drag-force and problems with damaged sealings and water leaks. Furthermore, the position of the shark fin antenna at the rear end of the vehicle is a radio shadow position, which is disadvantageous for receiving signals transmitted in the front of the vehicle.

In an attempt to solve some of these problems, integrated vehicle antennas have been developed without externally mounted and protruding parts. As an example, a mounting arrangement for a plurality of integrated antennas is disclosed in U.S. Pat. No. 6,118,410. The mounting arrangement comprises a windshield area with an upper horizontal border that is extended further up/backwards towards the rear end of the car. An extended roof portion, i.e., "shelf portion", is located below the windshield at the upper horizontal border and the antennas are placed upon the shelf portion.

However, the arrangement in U.S. Pat. No. 6,118,410 creates the additional space for the shelf-portion by extending the horizontal border of the front window further in the direction towards the back of the car, which results in a significantly larger windshield area. The large windshield area is dominating the design of the vehicle front and thereby limiting the design-freedom of the vehicle. In addition, a large windshield area is often a drawback from a safety perspective, as it provides less protection than the metal car body and body structure of the vehicle.

SUMMARY

In view of the above mentioned and other draw-backs of the prior art, it is an object of the present disclosure to provide a solution that alleviates the drawbacks of the prior art.

A first aspect of the present disclosure relates to a vehicle window assembly adapted to be mounted vertically above a header beam having a flange portion that extends in a direction towards the center of a vehicle until it transits into a depressed portion. The assembly comprises:

a communication module adapted to receive and/or send information signals, a main window area, including two upper and two lower corners and an upper main window area border extending from one of the upper corners to the other, wherein the upper main window area border is adapted to extend along the transition between the flange portion and the depressed portion of the header beam, and wherein an extended window area is abutting the upper main window area and having an elongation in a direction towards the center of the vehicle, such that the extended window area is formed as a partial extension of the main window area in a direction away from the upper main window area border, and wherein the extended window area having a lower border which is partially coinciding with the upper main window area border; and the communication module is at least partially covered by the extended window area.

The present disclosure is based on the realization that a window assembly can be designed as a composition of a communication module, a main window area and an extended window area, wherein the communication module is located to the extended window area. As a result, the overall appearance of the vehicle front can be maintained and fewer constraints are brought upon the design of the remaining vehicle structure such as the front and rear headers. Additionally, the mounting space for the communication module is located to the extended window area, such that the size of the transparent portion of the main window is not reduced. Specifically, the communication module is concentrated to an extended window area which is arranged outside the main window area.

To further clarify the distinction between the two window areas, the main window area serves the purpose of according visibility to a driver. The purpose of the extended window area is to provide a favorable location for the communication module, such that signals are able to freely pass through the surface of the extended window area. The main window area and the extended window area may together be referred to as a composed window area.

The composed window area is mounted onto a roof flange which is located to the upper edge of the composed window area. Furthermore, a header beam with a profiled cross section is arranged with a lateral extension (in relation to the vehicle) in the region adjacent to the roof flange. The header beam can be a front or rear header which is an outermost located header in relation to the longitudinal direction of a vehicle. The purpose of the front and the rear header is to provide a collision protective structure. The profiled header further comprises a header flange which is a segment of the profiled header that is arranged at a distal end of the profiled header. Specifically, the header flange stretches between a first free endpoint until a second endpoint in the shape of a transition point to a depressed portion in the header. The roof flange and the header flange are mounted and connected to each other such that an overlapping surface is achieved between the two flanges in a region where their lateral extensions coincide. Specifically, the roof flange and the header flange are arranged such that their extensions only coincide over a portion of the upper main window area border. In particular, according to the present disclosure, the direction of the roof flange and the external header flange divert at a first point until they converge at a second point.

In order to geometrically define the main window area, the header beam can serve as reference. Specifically, the upper main window area border is defined as an extension line from one of the upper main window area corners to the other. Partly, the upper main window area border is visible as a window edge that is abutting the car body. However, due to the presence of the extended window area, the upper main window area border is not visible in the conjunction between these window areas. Nevertheless, the upper window area border can in the conjunction between the main window area and the extended window area be defined as the transition between the flange portion and the depressed portion in the header beam.

The main window area is partially extended and departing from the upper main window area border, such that an extended window area is created. The extended window area has a longitudinal extension that coincides with the longitudinal extension of the vehicle. Hence, the longitudinal extension of the extended window area stretches from the upper main window area border to a second endpoint in a direction towards the center of the vehicle and which endpoint is defined by the edge of the extended window area.

The lateral extension of the extended window area can be defined as the distance between the point where the lateral extensions of the roof flange and the external header flange divert to the point where they coincide. The roof flange is thus "making a detour" to enclose and define portions of the border of the extended window area.

The measurement references in this specification are related to the vehicle, whereby the longitudinal direction of the vehicle is defined as the direction from the front to the rear of the vehicle. The lateral direction of the vehicle is thus defined as the direction from one side of a vehicle to the other. In the context of this specification, the center of a vehicle is defined as the center point in the longitudinal direction of the vehicle.

The definition of the lateral direction of the main window area is the direction defined between the two upper corners. The definition of the longitudinal direction of the main window area is the direction defined between one lower corner and one upper corner, which corners are located on the same side border of the main window area. Moreover, when the main window area is mounted onto a vehicle, the center longitudinal axis of the main window area coincides with the center longitudinal axis of the vehicle.

Additionally, in association with the main and extended window area, the term "corner" should be interpreted as an intersection of an upper/lower border and a side border. However, the corners may be sharp or rounded. Moreover, the main window area is typically of a rectangular shape, while the extended window area is a partial extension, or in other terms "an appendix" thereof.

The significance of the term "communication module" in the context of this application should be interpreted in a wide sense to any device that is capable of receiving and/or transmitting information. Typically, it may comprise an AM/FM radio receiver for receiving radio broadcasts, a GPS transmitter/receiver, an infrared or radar sensing device or any other type of signal transmitter/receiver that can either provide information to/from a driver, directly communicate with the vehicle or with an external signal emitting/receiving unit. The communication module is located to the cabin side of the extended window area.

According to an exemplary embodiment, the communication module is located between the extended window area and the header beam. By arranging the communication module between the extended window area and the load bearing structure, the present window assembly can be integrated into a vehicle structure without modifying the collision protective structure of the vehicle. On the contrary if, as described in prior art solutions, the upper window border is moved further towards the back end of the vehicle, then the header beam needs to be moved accordingly, which is disadvantageous from a safety perspective.

According to an exemplary embodiment, the communication module is completely or at least partially contained inside the depressed portion of the header beam. By adapting the module to fit within this space, more space is provided for the communication module and the structure of the load bearing structure can remain unchanged. Optionally, the communication module may rest upon the load bearing structure, which provides a support surface. Additionally or alternatively, the communication module or components thereof may be integrated inside the window.

According to an exemplary embodiment, the header beam is a front header or a back header. In order to arrange the extended window area in conjunction with a windshield or a rear window, the communication module is with advantage located between the car body and a front header or a back header.

According to an exemplary embodiment, the main window area is a front windshield or a rear window for a vehicle. The window assembly can with advantage be applied to a front windshield of a vehicle, as there are advantages associated with a communication module that is "forward facing" in the main driving direction. For instance, there are many devices related to safety or driving assistance that guide the operator based on visual or sensed information that is transmitted in front of the vehicle. On the other hand, there are also advantages associated with a communication module that is mounted at the rear of the vehicle, so that the communication module can be closer to capture traffic information from the area behind. In particular "Sedan" models often have a similar body structure at the upper border of the front windshield as at the upper border on the rear window, wherefore the window assembly can be mounted in a similar way and without impacting the body structure.

According to an exemplary embodiment, the main window area and the extended window area are formed as one continuous part.

According to an exemplary embodiment, the main window area and the extended window area are formed as two separate parts, which are joined together by a seam. An associated advantage is that the communication module can be accessed by only removing a portion, i.e., the extended window area, instead of removing the entire windshield or rear window.

According to an exemplary embodiment, the extended window area is located on the center longitudinal axis of the main window area, such that the shape of the extended window area is symmetrical around the axis. The location around the center axis of the main window area provides the advantage that the extended window area is coinciding with the area for mounting a rear-view mirror. Additionally, the location around the center longitudinal axis provides a less visible position, viewed from outside the vehicle.

According to an exemplary embodiment, the communication module is attached to an inner surface of the extended window area, suitably by an adhesive layer which is arranged between the extended window area and the communication module. However, other alternatives are possible. By attaching the communication module to the windshield or to the rear window, it can be accurately positioned in relation to the opaque regions of the window. In addition, the assembly process can be facilitated as the windshield or the rear window and the communication module can be preassembled such that they form one continuous part, which can be mounted to the car body in one operation. Consequently, if needed and depending on the type of adhesive used, the adhesive may be given sufficient time to cure before the windshield assembly is further manipulated and mounted to the vehicle.

According to an exemplary embodiment, the window assembly is applied to the front windshield and the rear window. Alternatively, the window assembly may be applied to the front and the rear window, such that the extended window area has a continuous extension between the front windshield and the rear window.

According to an exemplary embodiment, the lower border of the extended window area has a width in the lateral direction of the main window area, the width being between 6 and 50% of the length of the upper main window area border, suitably between 100 and 400 mm. According to an exemplary embodiment, the extended window area has a length in the longitudinal direction of the window of between 15-400 mm, suitably between 20-300 mm, and most suitably between 80-100 mm.

These measurements represent an adequate size of the extended window that is adapted in relation to the vehicle body structure, while still ensuring a sufficiently large area for the communication module to be positioned within.

According to an exemplary embodiment, the extended window area is partially or completely provided with an opaque material, suitably a ceramic material integrated in the glass or provided as a coating. An opaque coating provides an advantage of reducing the amount of UV light, which could otherwise degrade the electronic components of the communication module. Alternatively, the extended window area can be partially covered, such that sensitive electronic components are covered, while other components are visible. It may be an advantage to arrange light emitting and/or other visual indicators or sensors in non-coated areas, such that their detection capabilities are maintained. Additionally, their operation state (e.g., on/off/standby/error) may be visible from the outside of the vehicle if they are located to non-coated areas.

According to an exemplary embodiment, the extended window area consists of transparent material.

According to an exemplary embodiment, the extended window area is provided with a dotted opaque material over the entire extended window area or partly in some areas thereof According to an exemplary embodiment, the opaque areas are located in the areas where an adhesive is applied. An associated advantage is that the durability of the adhesive can be improved if it is protected from UV light.

According to an exemplary embodiment, the extended window area is provided with rounded corners. The extended window area may be provided with two rounded corners in the transition with the main window area and one or two rounded corners at the extremity of the extended window area. Rounded corners provide a durable structure for resisting strain. Additionally, the rounded corners reduce the potential damages associated with the assembly, as sharp edges are more likely to cause cracks in the window.

According to an exemplary embodiment, the communication unit is arranged in a package. By grouping the electronic components together in a package, the vehicle assembly can be simplified. Typically, the components included in the package may comprise sensors. Additionally, the package may be designed as a closed compartment, which provides the advantage that the communication unit is protected from material such as dust or dirt that may otherwise enter the compartment.

A second aspect of the present disclosure, in accordance with the first aspect thereof, relates to a method for mounting the inventive vehicle window assembly. The method comprises the steps of:

positioning a communication module in relation to a window, such that the communication module is adapted to be comprised within an extended window area, and attaching the communication module to the extended window area or to a header beam. An advantage of positioning the communication module in relation to a window, is that the assembly process of the vehicle is simplified.

In particular, the communication module can be preassembled to either the window or the header beam, such that the communication module is seamlessly integrated into the body structure.

According to an exemplary embodiment, the step of attaching the communication module is achieved by arranging an adhesive layer between the inner surface of the extended window area and a communication module, or arranging mechanical fastening means between the module and the header beam. Advantages include that the communication module is fixedly mounted to the window, whereby the communication module and window can be mounted together in a shared operation such that the assembly process is facilitated. The adhesive layer provides the advantage of a precise positioning of the communication module in relation to the opaque area on the window. By this precise positioning, the communication module does not imply any additional obstruction in the line of sight of a vehicle driver or a passenger.

According to an exemplary embodiment, the method is further comprising the step of:

aligning the localization point between the communication module and the extended window area, such that the communication module is adapted to be completely or at least partially contained within a depressed portion of a header beam. By adapting the module to fit within this space, no impact is brought upon the load bearing structure. Additionally, the space inside the depressed portion is fully used.

According to an exemplary embodiment, the header beam is a front header or a rear header.

According to a third aspect of the present disclosure, it relates to a vehicle comprising the inventive window assembly. The window assembly 10 comprising the extended window area and the communication module is thus provided together with a vehicle.

BRIEF DESCRIPTION OF THE DRAWINGS

Example embodiments according to the present disclosure will now be described in more detail with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, embodiments according to the present disclosure are described with reference to a front windshield of a passenger car. However, as previously described, the present disclosure is equally applicable to the rear window. It should also be noted that this disclosure by no means limits the scope of the present invention, which is equally applicable on other types of vehicles, such as busses and other types of utility vehicles.

Figure 1:
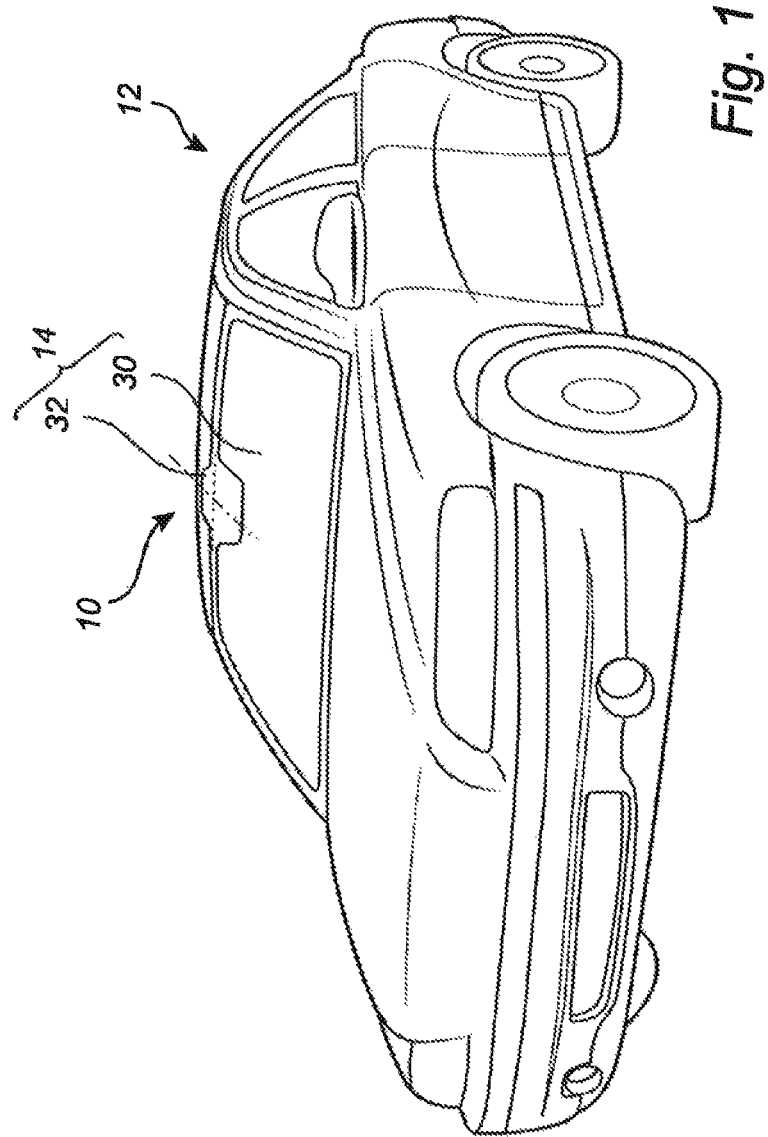
FIG. 1 is a schematic perspective view of the inventive vehicle window assembly.

FIG. 1 illustrates a vehicle window assembly 10 attached to a vehicle 12. The vehicle 12 is provided with a front windshield 14, which typically consists of or comprises tempered glass, but may also consist of or comprise any resistant and transparent material. The windshield 14 is divided into two areas; main window area 30 and an extended window area 32.

Figure 2:
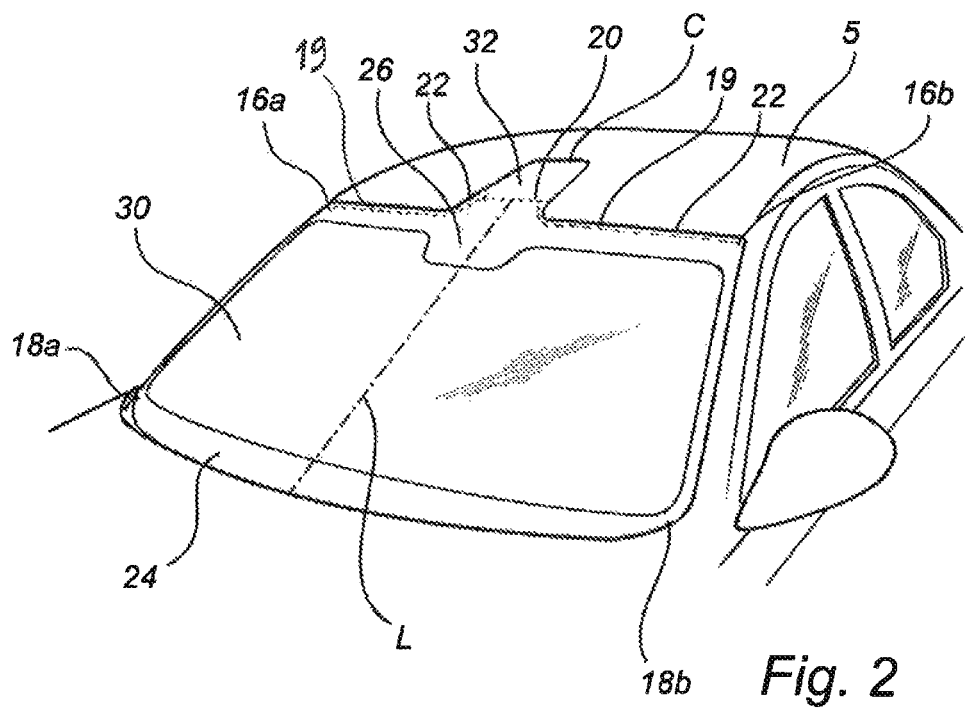
FIG. 2 is a detailed schematic perspective view of the inventive vehicle window assembly mounted to a vehicle.

As best seen in FIG. 2, the windshield 14 is provided with two upper corners 16a, 16b and two lower corners 18a, 18b. In order to define the boundaries of the main window area 30 and the extended window area 32, an upper main window area border 19 is arranged with a substantially horizontal extension from the first upper corner 16a to the second upper corner 16b, such that it partially abuts with an edge 22 of the vehicle's car body 5. The upper main window area border 19 represents the boundary between the main window area 30 and an extended window area 32. The extended window area 32 is located such that a lower border 20 of the extended window area 32 is partially coinciding with the upper main window area border 19.

Furthermore, the extended window area 32 is designed as a partial extension of the main window area 30 in a direction along the center longitudinal axis L of the vehicle 12, i.e., in a direction from the upper main window area border 19 to a furthermost located edge C of the extended window area 32. The extended window area 32 may be located on, and centered around the center longitudinal axis L of the front windshield 14. However, it is also possible to arrange the extended window area 32 such that it is off-centered from the center longitudinal center axis L of the front windshield 14. Typically, the extended window area 32 stretches 15-300 mm in the longitudinal direction towards the center of the vehicle 12.

The windshield 14 may be provided with an opaque window area 24 that covers the border edges of the main window area 30. The opaque window area 24 may also extend further from the top border towards the center of the main window area 30 at the location of a rear-view mirror 26. This opaque window area 24 may comprise a ceramic material and may provide a partially transparent or a completely opaque surface, or a combination of both types.

Figure 3:
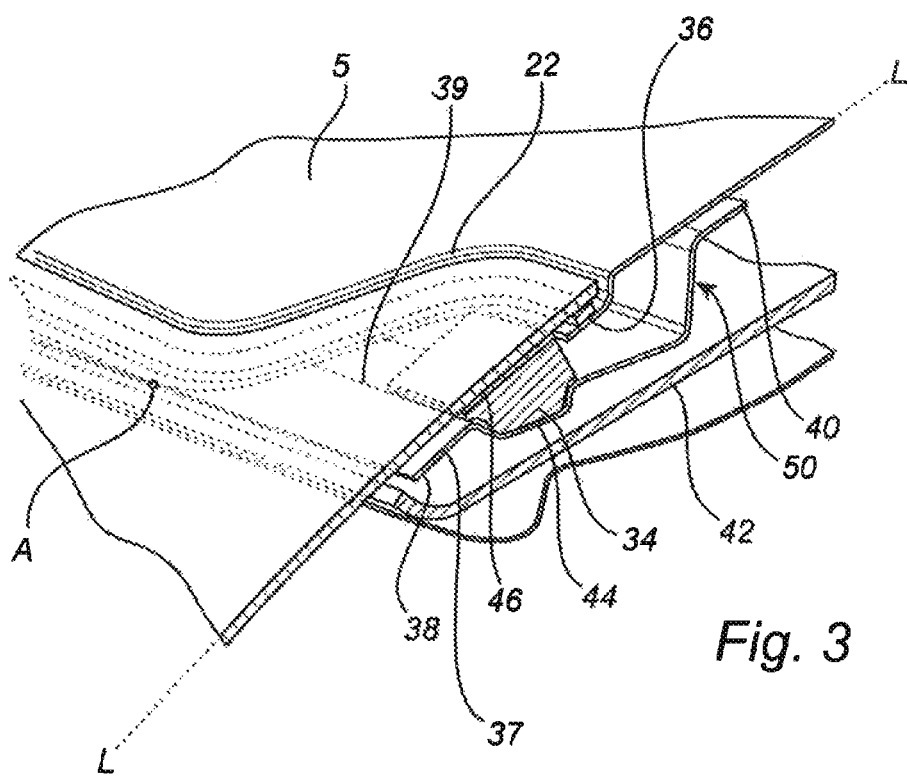
FIG. 3 is a cross-sectional perspective view of the inventive vehicle window assembly.

Now referring to FIG. 3, wherein the arrangement of a communication module 34 in relation to a header beam 50, in the shape of a front header, is further illustrated. The region at the upper main window area border 19 is coinciding with the location for a front header 50. The front header 50 has a front edge 38 adjacent to the windshield 14 and a rear edge 40 which is located further away in a direction towards the center of the vehicle 12. The front header 50 has a corrugated profile in order to provide an increased stiffness, and as a result, a depressed portion 44 is provided in the corrugated profile. A header flange 37 stretches between a first free endpoint 38 to a second endpoint 39, where the second endpoint 39 is defined as a transition point between the header flange portion 37 and the depressed portion 44.

The header flange 37 is connected to a roof flange 36, such that an overlapping surface is achieved between these two flanges. The overlapping surface is used for connecting the roof flange 36 and the header flange portion 37 together (e.g., by spot welding) in order to fixedly connect the car body 5 to the front header 50. Typically, the windshield 14 is attached to the roof flange 36 by an adhesive. The roof flange 36 and the header flange 37 are arranged such that their extensions coincide only over a portion of the upper main window area border 19. In particular, the direction of the roof flange 36 and the header flange 37 divert at a first point A until they converge at a second point B, which is not illustrated in the drawings, but mirror-inverted to point A with reference to the cut along the axis L. The width of the extended window area 32 thereby stretches from point A to point B, as viewed in the lateral direction of the vehicle 12.

Viewed from the inside of the vehicle 12, a headliner 42 is mounted on the inner side of the car body and may extend to the upper edge of the windshield 14, such that the header beam and other structural components are concealed.

Furthermore, the communication module 34 can be integrated into the vehicle 12, without externally mounted parts protruding outside the vehicle car body 5. The communication module 34 may comprise an AM/FM radio receiver for receiving radio broadcasts, a GPS transmitter/receiver, an infrared or radar sensing device or any other type of signal transmitter/receiver that can either provide information to/from a driver or directly communicate with the vehicle 12. The communication module 34 is located to the inner side of the extended window area 32. The surface of the extended window area 32 is permitting the signals to freely pass, which reduces potential interference that could otherwise arise if the metal car body 5 would cover the top surface of the communication module 34.

Additionally, the communication module 34 can be arranged as a package that bundles electronic components together, such that they are grouped in a unit. Specifically, by bundling the components together as a unit, the manipulation of the communication module 34 in e.g., the vehicle assembly process or in a repair process is facilitated.

The communication module 34 may be completely or partially contained inside the depressed portion 44 of the front header 50. The front header 50 may abut the communication module 34 in order to provide a rigid support surface 44 to the communication module 34. Alternatively, the communication module 34 is arranged at a distance from the front header 50. The surface of the communication module 34 facing to the front header 50 may be adapted to the profile/shape of the front header 50 in order to take maximum advantage from the available space between the extended window area 32 and the front header 50.

Moreover, the communication module 34 may be mounted in the extended window area 32 by arranging an adhesive layer 46 between the communication module 34 and the extended window area 32. The adhesive may for instance comprise polyurethane but also many other types of adhesives are possible to use. In an assembly process, the communication module 34 may be preassembled to the windshield 14 by applying the adhesive to the surface of the windshield 14 and then bringing the communication module 34 into contact with the adhesive layer 46. Additionally, or alternatively, the communication module 34 may be mounted onto the front header 50 by applying an adhesive or by arranging mechanical fastening means between the front header 50 and the communication module 34. Examples of mechanical fastening means may include bolts, screws or various types of clamping means.

The communication module 34 is connected to the main electrical harness by creating an aperture (suitably of small dimension) in the front header 50 and routing an electric connector (such as a "pig-tail" cable) there through to connect with the main electric harness of the vehicle 12.

Figure 4A:
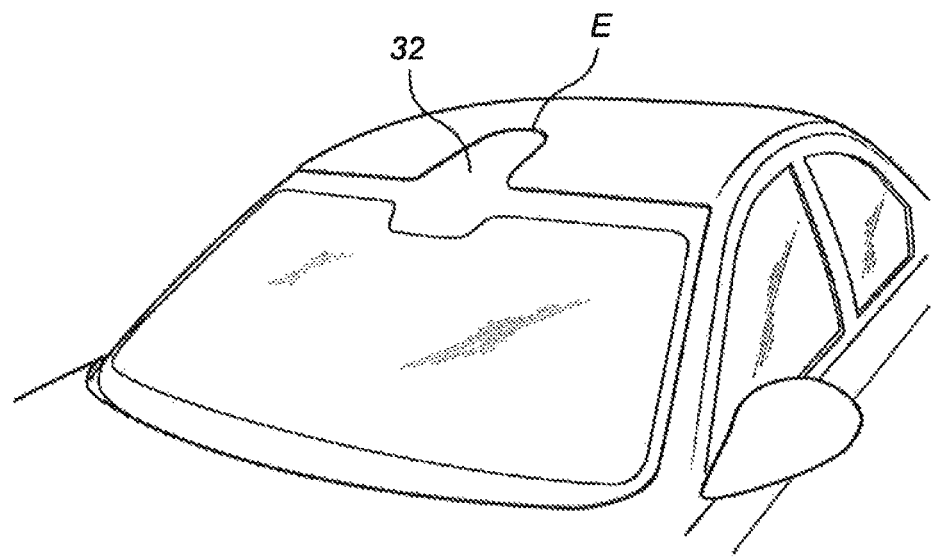
FIGS. 4a and 4b are schematic perspective views of exemplary embodiments according to the present disclosure.
Figure 4B:
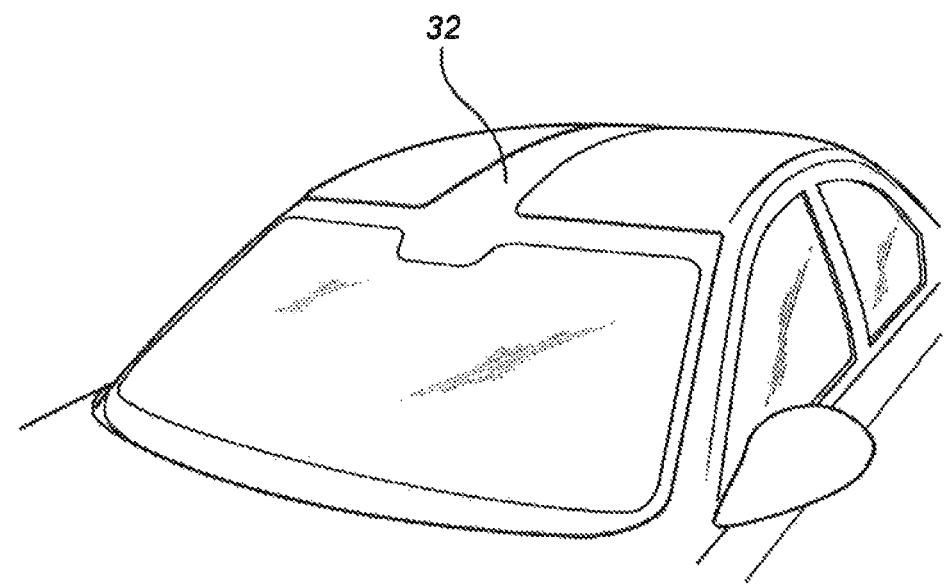

FIGS. 4a and 4b show examples of alternative embodiments and various possible designs of the extended window area 32 according to the present disclosure. As illustrated in FIG. 4a, the extremity E of the extended window area 32 may have an elliptic shape. FIG. 4b shows another exemplary embodiment, wherein the extended window area 32 has a continuous elongation from the front windshield 14 to a rear window, whereby the front windshield 14 is connected to the rear window.

In an exemplary method for mounting the vehicle window assembly, the communication module 34 is first positioned in relation to a window, such as a front windshield 14 or a rear window for a vehicle 12. The communication module 34 is positioned such that it is at least partially comprised within the extended window area 32. Thereafter, the communication module 34 is attached to the inner surface of the extended window area 32 or to a header beam 50, such as a front header 50. The step of attaching the communication module 34 can be achieved by arranging an adhesive layer 46 between the inner surface of an extended window area 32 and the communication module 34, or by arranging mechanical fastening means between the communication module 34 and the front header 50. Additionally, the localization point between the communication module 34 and the window can be further aligned in relation to a depressed portion 44 in the front header 50.

The skilled person will realize that the present disclosure by no means is limited to the described exemplary embodiments.

The mere fact that certain measures are recited in mutually different dependent claims does not indicate that a combination of these measures cannot be used to advantage. Moreover, the expression "comprising" does not exclude other elements or steps. Other non-limiting expressions include that "a" or "an" does not exclude a plurality and that a single unit may fulfill the functions of several means. Any reference signs in the claims should not be construed as limiting the scope. Finally, while the disclosure has been illustrated in detail in the drawings and in the foregoing description, such illustration and description is considered to be illustrative or exemplary and not restrictive; the disclosure is not limited to the disclosed embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle window assembly adapted to be mounted above a header beam having a flange portion that extends in a direction towards a center of a vehicle until the flange portion transits into a depressed portion, the assembly comprising:
    a communication module adapted to receive and/or send information signals;
    a main window area, including two upper and two lower corners and an upper main window area border extending from one of the upper corners to the other, wherein the upper main window area border is adapted to extend along the transition between the flange portion and the depressed portion of the header beam; and
    an extended window area abutting the main window area and having an elongation in a direction towards the center of the vehicle, such that the extended window area is formed as a partial extension of the main window area in a direction away from the upper main window area border, wherein the extended window area has a lower border that partially coincides with the upper main window area border;
    wherein the communication module is adapted to be at least partially covered by the extended window area.

2. The vehicle window assembly according to claim 1 wherein the communication module is adapted to be located between the extended window area and the header beam.

3. The vehicle window assembly according to claim 2 wherein the communication module is adapted to be completely or at least partially contained inside the depressed portion of the header beam.

4. The vehicle window assembly according to claim 1 wherein the header beam is a front header or a rear header.

5. The vehicle window assembly according to claim 1 wherein the main window area is a front windshield or a rear window.

6. The vehicle window assembly according to claim 1 wherein the main window area and the extended window area are formed as one continuous part.

7. The vehicle window assembly according to claim 1 wherein the extended window area is located on a center longitudinal axis of the main window area, such that the shape of the extended window area is symmetrical with respect to the longitudinal axis.

8. The vehicle window assembly according to claim 1 wherein the communication module is attached to an inner surface of the extended window area by an adhesive layer that is arranged between the extended window area and the communication module.

9. The vehicle window assembly according to claim 1 wherein the lower border of the extended window area has a width in a lateral direction of the main window area, the width being between 6 and 50% of a length of the main upper window border.

10. The vehicle window assembly according to claim 9 wherein the width of the lower border of the extended window area is between 100 and 400 mm.

11. The vehicle window assembly according to claim 1 wherein the extended window area has a length in a longitudinal direction of the extended window area of between 15 to 400 mm.

12. The vehicle window assembly according to claim 1 wherein the extended window area is partially or completely provided with an opaque material.

13. The vehicle window assembly according to claim 12 wherein the extended window area comprises glass, and the opaque material comprises a ceramic material integrated in the glass or provided as a coating.

14. A vehicle comprising a vehicle window assembly according to claim 1.

15. A method for mounting a vehicle window assembly, the method comprising:
    positioning a communication module in relation to a window, such that the communication module is at least partially covered by an extended window area of the window; and attaching the communication module to the extended window area or to a header beam of a vehicle, the header beam having a flange portion that extends in a direction towards a center of the vehicle until the flange portion transits into a depressed portion;

wherein the window has a main window area, including two upper and two lower corners and an upper main window area border extending from one of the upper corners to the other, the upper main window area border being adapted to extend along the transition between the flange portion and the depressed portion of the header beam, wherein the extended window area abuts the main window area and has an elongation in a direction towards the center of the vehicle, such that the extended window area is formed as a partial extension of the main window area in a direction away from the upper main window area border, and wherein the extended window area has a lower border that partially coincides with the upper main window area border.

16. The method according to claim 15 wherein attaching the communication module is achieved by arranging an adhesive layer between an inner surface of the extended window area and the communication module, or arranging mechanical fastening means between the communication module and the header beam.

17. The method according to claim 16 further comprising:

aligning a localization point between the communication module and the extended window area, such that the communication module is adapted to be completely or at least partially contained within the depressed portion of the header beam.

18. A method for assembling a vehicle window assembly, the method comprising:

positioning a communication module in relation to a window, such that the communication module is at least partially covered by an extended window area of the window; and attaching the communication module to the extended window area or to a header beam of a vehicle;

wherein the window has a main window area, including two upper and two lower corners and an upper main window area border extending from one of the upper corners to the other, wherein the extended window area abuts the main window area and has an elongation in a direction towards a center of the vehicle, such that the extended window area is formed as a partial extension of the main window area in a direction away from the upper main window area border, and wherein the extended window area has a lower border that partially coincides with the upper main window area border.

* * * * *